(12) United States Patent
Korst et al.

(10) Patent No.: US 11,036,748 B2
(45) Date of Patent: Jun. 15, 2021

(54) METHOD AND APPARATUS FOR GENERATING A SORTED LIST OF ITEMS

(75) Inventors: Jan Korst, Eindhoven (NL); Serverius Petrus Paulus Pronk, Vught (NL); Mauro Barbieri, Eindhoven (NL); Ramon Clout, Eindhoven (NL)

(73) Assignee: FUNKE TV GUIDE GMBH, Hamburg (DE)

(*) Notice: Subject to any disclaimer, the term of this patent is extended or adjusted under 35 U.S.C. 154(b) by 1088 days.

(21) Appl. No.: 14/239,836

(22) PCT Filed: Sep. 4, 2012

(86) PCT No.: PCT/EP2012/067228
§ 371 (c)(1),
(2), (4) Date: Feb. 20, 2014

(87) PCT Pub. No.: WO2013/034554
PCT Pub. Date: Mar. 14, 2013

(65) Prior Publication Data
US 2014/0214839 A1    Jul. 31, 2014

(30) Foreign Application Priority Data
Sep. 8, 2011 (EP) .................................. 11180640

(51) Int. Cl.
*G06F 16/20* (2019.01)
*G06F 16/40* (2019.01)
(Continued)

(52) U.S. Cl.
CPC ...... *G06F 16/248* (2019.01); *G06F 16/24578* (2019.01); *G06F 16/44* (2019.01);
(Continued)

(58) Field of Classification Search
CPC .............................................. G06F 17/30554
See application file for complete search history.

(56) References Cited

U.S. PATENT DOCUMENTS

| | | | | |
|---|---|---|---|---|
| 5,758,257 A | * | 5/1998 | Herz | .................... G06Q 20/383 348/E7.056 |
| 2004/0194141 A1 | * | 9/2004 | Sanders | ............ G06F 17/30817 725/53 |

(Continued)

FOREIGN PATENT DOCUMENTS

| | | |
|---|---|---|
| CN | 100573513 C | 12/2009 |
| EP | 1 591 923 A1 | 11/2005 |

(Continued)

OTHER PUBLICATIONS

J. Carbonell, et al; "The use of MMR, Diversity-Based Reranking for Reordering Documents and Producing Summaries;" Internet Citation, 1998, retrieved from Internet on Sep. 9, 2005; whole document.

(Continued)

*Primary Examiner* — Kristopher Andersen
(74) *Attorney, Agent, or Firm* — Ware, Fressola, Maguire & Barber LLP

(57) ABSTRACT

An electronic device and method for automatic generation of a sorted list of items related to a seed item comprises a relatedness determinator to compare the seed item with a plurality of further items and to determine a relatedness value for each further item with respect to the seed item. The device also has a clustering engine to cluster the further items by determining a relative relatedness between (among) the further items. Each further item is assigned to one cluster. The device also has a list generator to generate a sorted result list by sorting the further items according to both, their relatedness value and their belonging (or membership) to a cluster in that once an item is added to the sorted list, the relatedness value depending ranking of the further items in that cluster is at least momentary lowered so as to promote adding items of further clusters.

5 Claims, 1 Drawing Sheet

(51) Int. Cl.

| | |
|---|---|
| *G06F 16/70* | (2019.01) |
| *G06F 16/248* | (2019.01) |
| *H04N 21/482* | (2011.01) |
| *H04N 21/475* | (2011.01) |
| *H04N 21/466* | (2011.01) |
| *H04N 21/81* | (2011.01) |
| *G06F 16/44* | (2019.01) |
| *H04N 21/84* | (2011.01) |
| *G06F 16/2457* | (2019.01) |
| *G06F 16/738* | (2019.01) |
| *H04N 21/40* | (2011.01) |
| *H04N 21/80* | (2011.01) |

(52) U.S. Cl.
CPC ......... *G06F 16/738* (2019.01); *H04N 21/466* (2013.01); *H04N 21/4668* (2013.01); *H04N 21/4755* (2013.01); *H04N 21/482* (2013.01); *H04N 21/4826* (2013.01); *H04N 21/8133* (2013.01); *H04N 21/84* (2013.01)

(56) References Cited

U.S. PATENT DOCUMENTS

| | | | |
|---|---|---|---|
| 2007/0094242 A1 | 4/2007 | Dove et al. | |
| 2008/0154878 A1 | 6/2008 | Rose et al. | |
| 2010/0217613 A1* | 8/2010 | Kelly | G06Q 30/02 705/1.1 |
| 2013/0097153 A1* | 4/2013 | Barbieri | G06F 17/30817 707/722 |

FOREIGN PATENT DOCUMENTS

| | | |
|---|---|---|
| RU | 2 343 537 C2 | 10/2005 |
| WO | 2010/088299 A1 | 8/2010 |

OTHER PUBLICATIONS

S. Deerwester, et al; "Indexing by Latent Semantic Analysis;" 1990; whole document.

G. Salton, et al; "Term-Weighting Approaches in Automatic Text Retrieval;" Information Processing & Management, vol. 24, No. 5; Nov. 19, 1987; pp. 513-523.

\* cited by examiner

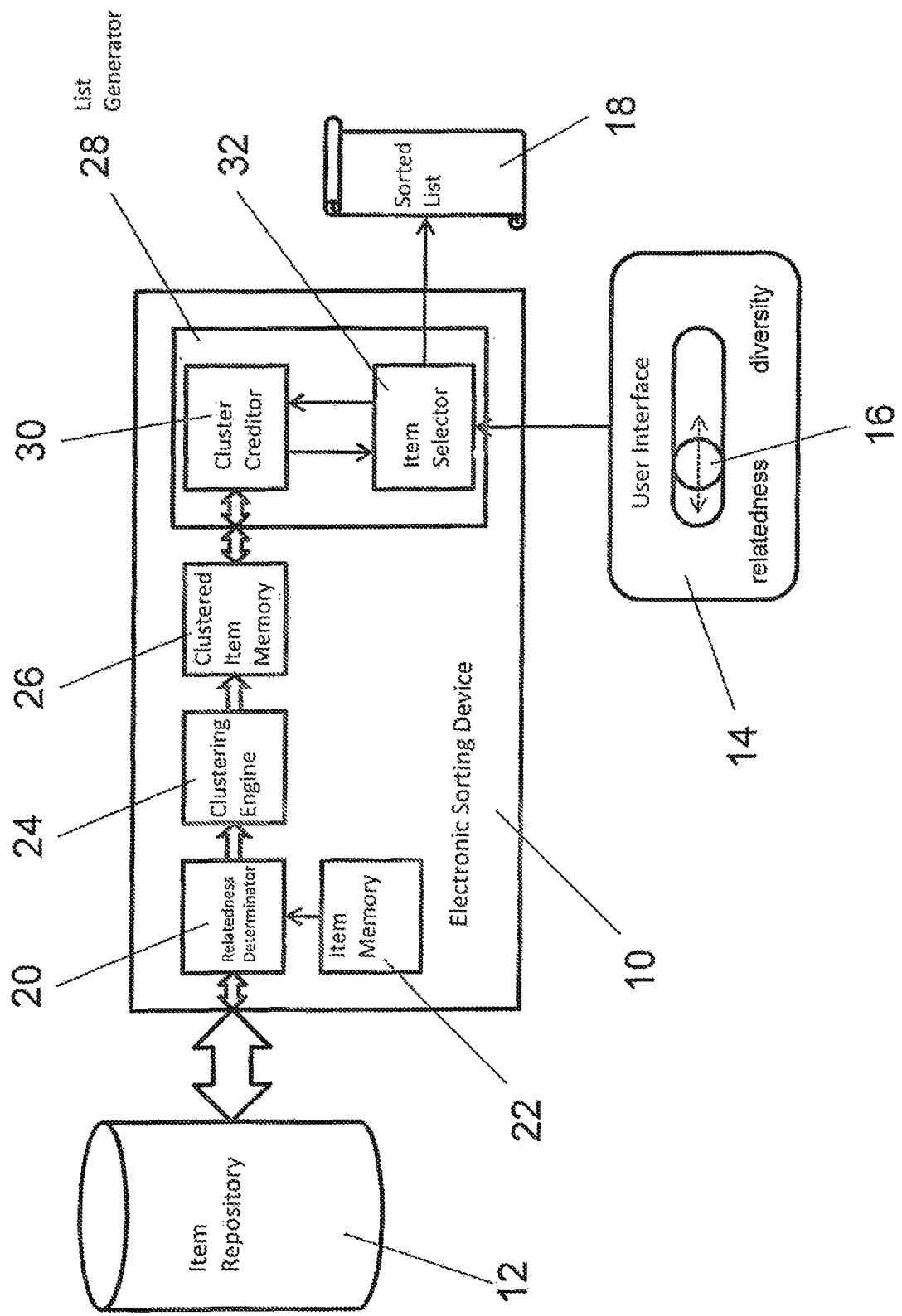

METHOD AND APPARATUS FOR GENERATING A SORTED LIST OF ITEMS

CROSS REFERENCE TO RELATED APPLICATIONS

This application is the U.S. National Stage of International Application Number PCT/EP2012/067228 filed on Sep. 4, 2012 which application claims priority under 35 USC § 119 to European Patent Application No. 11180640.2 filed on Sep. 8, 2011. Both applications are hereby incorporated by reference in their entirety.

TECHNICAL FIELD

The invention relates to automatic sorting of items such as items resulting from queries or other items that are characterized by parameters, words or attributes that can be compared.

BACKGROUND OF THE INVENTION

A personal channel can easily be created by a user by selecting a so-called "seed" TV program. The system will next search similar TV programs that are automatically added to the newly-created personal channel. Additionally, a personal channel is equipped with a recommender system that learns over time what TV programs the user appreciates in the specific personal channel, by analysing explicit or implicit user feedback. In this way, to a user can easily create, for example, his personal movie channel, his personal shows channel, his personal cartoon channel, etcetera.

Recently, watching online videos from, e.g., YouTube has become a popular alternative for TV watching. This, however, requires a more active attitude of the user, since he will usually have to type in textual queries to search for interesting videos on such video repositories. Alternatively, browsing through categories or a list of most popular videos may not require textual input, but correspondingly does not provide personalized results.

SUMMARY OF THE INVENTION

Integrating the lean-back TV viewing experience with browsing through internet videos is generally seen as an important challenge, and this invention is related to realizing this challenge A first important step in realizing an integrated environment where users can enjoy both TV programs and internet videos is realized by offering internet videos that are related to the TV programs in a personal channel. To this end, the inventors have developed a method that tries to find internet videos that are related to a given TV program, by generating multiple queries. These queries depend on the genre of the TV program. For example, if the TV program is a movie, then the queries aim at finding trailers, interviews with the director, interviews with main actors, deleted scenes, etcetera. For a documentary, the queries aim at finding related videos about the same subject. These queries are generated using the information that is available in the metadata description of the TV program, such as title, genre, cast, etcetera. The queries are next sent to the online video repositories. The results that are returned for the different queries are next combined into a single list of results, where one wants the videos that are most related to the given TV program to appear in the top of the list.

To determine the relatedness between an internet video and a TV program, it is assumed that their descriptions will use similar words. A straightforward approach to specify relatedness is to measure the degree of overlap in words used, where words can be weighed by using the so-called tf*idf approach [Salton & Buckley, 1987]. A straightforward approach is to represent a TV program p and an internet video v each by a vector, where each entry in the vectors corresponds to a word that possibly appears in the descriptions of the corresponding items and where the value of the entry is given by the tr*df weight. The relatedness between p and v can then be quantified by the cosine between these vectors. More advanced approaches for quantifying relatedness are also possible, for example, using latent semantic analysis [Deerwester et al., 1990].

Before presenting the details of the actual invention, first some notation is introduced. For a given reference (or seed) item, e.g. a TV program p and a given further item, e.g. an internet video v, let $rel(v,p) \in [0,1]$ denote the relatedness between v and p. In addition, for a given reference item, e.g. the TV program p, let $Q(p)=\{q_1, q_2, \ldots, q_n\}$ denote the set of queries that are used to find related further items, e.g. internet videos. For a query $q_i \in Q(p)$, let $R(q_i)=\{r_{i1}, r_{i2}, \ldots, r_{im_i}\}$ denote the set of results that are returned by the item repository (internet video repository) on query $q_i$.

Now, one could simply join all results given by $R_{total}=R(q_1) \cup R(q_2) \cup \ldots \cup R(q_n)$, and order them by decreasing relatedness to program p into a list of final results: $f_1, f_2, \ldots, f_N$, with $$rel(f_i, p) \geq rel(f_{i+1}, p),$$

for $i=1, \ldots, N-1$.

It is an object of the invention, to provide for improved automatic generation of a sorted list where the order of items shall place most relevant or interesting items in the first places of a list.

This object is achieved by an electronic device for automatic generation of a sorted list of to items related to a seed-item. The electronic device comprises a relatedness determinator that is configured to compare said seed item with a plurality of further items and to thus determine a relatedness value for each further item with respect to said seed item. The electronic device further comprises a clustering engine that is configured to cluster the further items by determining a relative relatedness between (among) the further items. Thus, each further item is assigned to one cluster. The device further comprises a list generator that is configured to generate a sorted result list by sorting the further items according to both, their relatedness value and their belonging (or membership) to a cluster in that once an item is selected to be added and further on added to the sorted list, the relatedness value depending ranking of the further items in that cluster is at least momentary (at least for a number of further selection cycles) lowered so as to promote adding items of further clusters thus achieving a higher momentary relatedness value depending ranking to the top of the sorted list.

The selection of an item to be added to the sorted list thus is carried out by the device in two steps: firstly, the cluster with the highest ranking (later on called "credit" in this description) is selected and within the so-selected cluster the item with the highest ranking is selected. A cluster has a ranking (reflected by its credit) that is, based on the relatedness function on the still selectable elements in that cluster. It is thus a momentarily highest ranking (credit) of a cluster that governs which cluster is selected next, but within the selected cluster, an item with highest relatedness is selected, because the ranking of the items within a particular cluster is determined by the relatedness value of a particular item compared to the relatedness value of the other items in that cluster.

Preferably the list generator is further configured to only add items to the sorted list that belong to a cluster comprising items exceeding a predetermined or user-adjustable relatedness value threshold.

This lowering of the rank of a cluster after an item from that cluster was selected will automatically cause the addition of items from other clusters because the other clusters thus gain a relatively higher rank. This promotes adding items of further clusters to the sorted list to obtain diversity, because the item with the highest rank (Relatedness value) within selected cluster may have a lower relatedness value than an item in a cluster with a just lowered rank. The latter effect is preferably achieved by providing a list generator that comprises a cluster creditor that is configured to assign credits to the clusters and to decrease a credit of the cluster from which a selected item that was added to the list comes from. Selection of items is then performed based on the credits of the clusters the items belong to. Thus, relative lowering of the credit of a cluster results in a relative lower rank of the items in the cluster. It is to be noted, that decreasing a credit shall always be by a relative decrease of a credit with respect to other credits and thus includes the case where credits of other clusters are increased while the credit of the one cluster is just maintained.

The cluster creditor is preferably further configured to initially assign initial credits to the clusters. The initial credits may either depend on the relatedness value of the item having the highest relatedness value in each one of the clusters or may be a predetermined value, e.g. zero. In the latter case, the initial credits are then updated by adding added credit to the clusters, wherein the added credit depends on the relatedness value of the item having the highest relatedness value in a respective one of the clusters in relation to the relatedness value of the item having the highest relatedness value in the other clusters. In response to the selection of items to be added to the sorted list, the credits of non-selected clusters are iteratively updated for instance by adding added credit to the clusters, wherein the added credit depends on the relatedness value of the item having the highest relatedness value in a respective one of the clusters in relation to the relatedness value of the item having the highest relatedness value in the other clusters. Non selected clusters are all clusters except for the cluster that provided for the last item added to the sorted list.

The list generator preferably further comprises an item selector that is configured to select an item that is to be added to the list that has the highest relatedness value in a cluster having the highest credit, and to add the selected item to the sorted list and to remove said selected item from the cluster it belonged to.

By maintaining such credit or—more general—by selecting items one-by-one and amending the rank of the non-selected items after each selection an automatic balancing of relatedness and diversity of search results can be achieved.

The electronic device for automatic generation of a sorted list of items is a sorting device for automatically sorting items according to relatedness to a seed item. Preferably, the sorting device comprises a relatedness based sorting means and a diversity promoting means and an adjustment means connected to an input of the device, said adjustment means being configured to promote diversity of a result list diverging from a strict relatedness determined order of the result list depending on a diversity factor entered by a user.

According to a further preferred embodiment, the diversity factor is defined by a threshold for electing clusters of items that qualify for a selection of items added to a sorted list of items. In other words: the threshold determines eligibility of clusters from which items can be added to a sorted list. The threshold does not influence the previous clustering.

The object of the invention is further solved by a method for sorting items by creating a sorted list, wherein the method comprises the steps of providing a seed item (reference item), comparing a plurality of further items to said reference item (seed item) and deter-mining a relatedness value for each further item, said relatedness value reflecting a degree of similarity of said further item from said plurality of items with the reference item, clustering said further items into a number of clusters by comparing said further items with each other to determine degrees of mutual similarity among said further items and grouping said further items in clusters so that each item belongs to one cluster that contains items with relatively high degree of similarity among them compared to items in other clusters, generating a sorted list from said further items by scheduling said further items depending on their relatedness value and their membership to a certain cluster in an iterative manner, wherein items are added to said list one-by-one and initially a) initial credits are assigned to said clusters, wherein the initial credit may be a predetermined value such as zero or may depend on the relatedness value of the item having the highest relatedness value in each one of said clusters, and in each iterative step, b) credits are updated by adding added credit to said clusters, said added credit may depend on the relatedness value of the item having the highest relatedness value in a respective one of said clusters in relation to the relatedness value of the item having the highest relatedness value in the other clusters or the added credit may be a predetermined value c) an item that is to be added to said list is selected that has the highest relatedness value in a cluster having the highest credit, d) the selected item is added to said list and removed from said cluster, e) the credit of the cluster from which the added item was removed is decreased, and repeating steps b) to e) until all or a predetermined number of said further items are added to said list.

It is to be noted that adding credit to the clusters only amends the relative rank of the clusters compared to other clusters while the relatedness value of the items in the clusters remain unamended and thus the relative rank of the items themselves is not altered by altering the credit of the clusters.

Preferably, the method step b) "updating credits" is performed only with those clusters including items that have a relatedness value that is higher than a predetermined fraction of the highest relatedness value of all further items in any cluster. Thus, a threshold for electing clusters that qualify for further selection is introduced. The value of the threshold can preferably be user adjustable in order to influence automatic list generation. A high threshold results in list where the order of items is primarily determined by their relatedness to the reference or seed item whereas a low threshold promotes diversity in the top of the list.

Accordingly, an electronic device is preferred that comprises a user interface for adjusting the threshold value.

In particular an electronic device is preferred wherein the cluster creditor is configured to update credits only for those clusters that comprise at least one item with a relatedness value that exceeds a predetermined fraction of the highest relatedness values of all items that have not yet been added to the list and removed from the clusters.

In such embodiment a threshold adjustment user interface can allow for entering a threshold value that determines said fraction.

More generally speaking, the object of the invention is further achieved by a sorting device for automatically sorting items according to relatedness to a seed (reference) item, wherein the sorting device comprises a relatedness based sorting means and a diversity promoting means and an adjustment means connected to an input of the device, wherein the adjustment means is configured to promote diversity in the top of the results list diverging from a strict relatedness determined order of the result list depending on a diversity factor entered by a user. The diversity factor preferably is defined by a threshold for electing clusters of items that qualify for a selection of items added to a sorted list of items.

Clustering preferably is performed by
starting with N clusters, where each cluster contains a unique single item
merging the two most similar clusters, where similarity between two clusters can be defined by the minimum or average similarity between its items, and
repeating the merging of clusters until a predetermined number of clusters is obtained.

The invention includes the recognition that ordering or sorting of items or search results by relatedness only has the drawback that the most related further items (e.g. videos) may all be very similar. For example, in case the reference or seed item (a TV program) p is a movie, the most related further items (videos) may all be trailers of this movie. In that case, the top on the list of results would only contain trailers. For a user, it would be more interesting to have more diverse results in the top of the results list, i.e., to have in the top of the results list not only trailers but also interviews with the main actors, a video with the movie's theme song, deleted scenes, etcetera, even if these videos would have a lower relatedness.

Hence, the problem is how to increase diversity in the top of the list, while still giving preference to videos that have a high relatedness, and still avoiding items (e.g. search results) in the top that have a very low relatedness.

According to this invention a solution is provided to balance relatedness and diversity. In this solution, the user will be able to indicate how much diversity he would prefer.

The basic idea underlying the preferred embodiments of the invention is to order the to items (e.g. search results or results of a query) in $R_{total}$ i.e., the set of all items that are returned by the various queries, taking into account both relatedness and diversity. The approach is based on combining the following two components:
1. A clustering step performed by a clustering engine that clusters the further items (e.g. videos) $R_{total}$ into a set of clusters $C_1, C_2, \ldots, C_k$ such that each cluster contains similar items like, for instance, videos. For convenience, we assume that the items in a cluster are given as a list of items ordered by decreasing relatedness. In other words, the item with the highest relatedness value in a cluster has the highest rank.
2. Next, a credit-based scheduling step performed by a selector is used to repeatedly select a first item—that is the item with the highest relatedness value—of one of the clusters to remove it from the cluster and add it to the list of final results. This procedure is repeated until all items are added to the final results list and all clusters are empty. Alternatively the procedure can be stopped if a sufficient number of items is added to the final results list.

The credit-based scheduling preferably uses a relative threshold that determines how much diversity is allowed, possibly at the cost of getting less highly related results in the top.

BRIEF DESCRIPTION OF THE DRAWINGS

The invention shall now be described by way of example with reference to the FIGURES. In the FIGURES FIG. 1 is a diagrammatical representation of a sorting device according to the invention

DETAILED DESCRIPTION

In FIG. 1, an electronic sorting device 10 is depicted that is temporarily or permanently connected to an item repository 12. The electronic sorting device 10 has a user interface 14 with a relatedness/diversity adjustor 16. A further user interface for entering or selecting a seed item may also be provided.

The electronic sorting device 10 has an output port for outputting a sorted list 18 of items (also called final items list or final results list in this description).

Between the electronic sorting device 10 and the item repository 12 a query generator may be provided for generating queries to be sent to item repositories. These queries are preferably based on a seed item e.g. stored in reference item memory 22 of the electronic sorting apparatus 10. Therefore, the query generator is preferably connected to the reference item memory 22. The query generator is further configured to receive results from said queries representing further items that are somehow related to the seed item and that are to be sorted.

Members of the electronic sorting apparatus 10 are a relatedness determinator 20 that is connected to the reference item memory 22. In reference item memory 22, attributes, words or data characterizing a reference item are stored. The reference item thus defined acts as a seed item for generating a list of related items found in the item repository 12.

The relatedness determinator 20 is further connected to a clustering engine 24 that, when in use, clusters the items found in the item repository depending on their relatedness to the seed or reference item defined in memory 22. As a result, clustering engine 24 generates clusters of further items related to the seed item.

The output of clustering engine 24 is forwarded to a clustered item memory 26 that can be accessed by the list generator 28 that can act as an item scheduler for scheduling items in a sorted list of items.

The list generator 28 comprises a cluster creditor 30 and an item selector 32.

The cluster creditor 30 is configured to assign and update credits to the clusters of items stored in clustered item memory 26.

The item selector is configured to select the item having the highest relatedness value in the cluster having the highest credit. The item so selected is then be added to the list 18 and removed from the cluster in clustered item memory 26.

Further, the credit of the cluster where the item is removed from is lowered, e.g. by 1, as disclosed in further detail hereinafter.

Selection of items by the item selector includes the election of clusters that qualify for selection of item. Such election of clusters is based on the relatedness value of the highest ranked item in each cluster. The item selector is adapted to elect only those clusters wherein the highest ranked item has a relatedness value that corresponds to a predetermined fraction of the highest relatedness value of all items and all clusters. The fraction thus defines a threshold that can be adjusted by way of the relatedness/diversity adjustor 16 of user interface 14.

The electronic sorting device thus defines a machine for automatic sorting of items according to their relatedness to a seed item. A sorting device comprises a relatedness sorting means and a diversity promoting means and an adjustment means for adjusting a threshold that either promotes diversity of a result list or a more relatedness-determined order depending on how the threshold is adjusted.

The operation of the electronic sorting device 10 and the method of sorting items is now disclosed in further detail and by way of example.

Clustering engine and clustering step.

For the clustering two possible embodiments are considered. The first embodiment could simply take the clustering that results from the different queries that were used. In other words, if n queries $q_1, q_2, \ldots, q_n$ are used and the corresponding item sets are given by $R(q_1), R(q_2), \ldots, R(q_n)$, then we assume n clusters $C_1, C_2, \ldots, C_n$ where cluster $C_i$ is given by $R(q_i)$ and thus represents the results (items) from one query. The assumption in this embodiment is that each query gives a set of results (items) that are mutually similar but dissimilar from items that are the results of other queries.

An alternative embodiment is obtained by first combining all results of all queries to a single set of items and then cluster these items based on mutual similarity. To measure the mutual similarity of two items $r_{ik}$ and $r_{jl}$ we can again use the cosine similarity of the corresponding word vectors. Based on this similarity, we can use one of numerous wellknown clustering approaches. One of these approaches is to start with N clusters, where each cluster contains a unique single item. Next, repeatedly the two most similar clusters are merged, where similarity between two clusters can be defined by the minimum or average similarity between its elements (i.e., results or items, respectively). The merging of clusters can be repeated until a sensible number of clusters is obtained.

Note that during the clustering in this last embodiment, the similarity between items is determined. This could, additionally, be used to delete some of the items that are very to similar to other items but have a lower or equal relatedness to p.

Credit-based scheduling by cluster crediting and item selection in the item selector.

Credit-based scheduling of further items works as follow. We assume a given set of clusters, where for each cluster the items in the cluster are given as a list of items, ordered by decreasing relatedness (and thus, decreasing rank) to p. Next, in each iteration a cluster is selected to contribute its current top item to the final list of items and removes this item from its list. This selection process works as follows. We first present a simplified version without a threshold.

Credit-based scheduling without threshold.

For each cluster $C_i$ a credit $c_i$ is maintained. Initially, the credits of all clusters are zero. Then, at the start of each iteration, a total amount of credit equal to one is shared among the clusters, and for each cluster, its share is added to its current credit. After updating the credits, a cluster with the highest credit is selected to contribute its current top item to the final list of items, i.e., this top item is removed from its item list and appended to the final items list. And, finally, the credit of this cluster is lowered by one. Hence, in each iteration a total amount of credit equal to one is shared between the clusters and a total amount of credit equal to one is again subtracted from the cluster with the highest credit. As a consequence, the sum of credits of all clusters remains zero after each iteration.

The clusters are denoted by $C_1, C_2, \ldots, C_k$. For a cluster $C_i$, let the relatedness of the highest related result that is still in $C_i$ at the start of iteration t be denoted by $r(i,t)$. Hence, given that we keep an ordered list of items for each cluster $C_i$ we only have to determine the relatedness of the item that is first in this list to determine $r(i,t)$. Then at the start of each iteration t, we add a share of $$r(i,t)/\Sigma_j r(j,t)$$

to the credit of cluster $C_i$. In other words, for each cluster $C_i$ at the start of iteration t, $$c_i := c_i + r(i,t)/\Sigma_j r(j,t).$$

Let $i_{max}(t)$ be the index of a cluster that has the highest credit at iteration t, after increasing the credits. In other words, $c_{i_{max}(t)} = \max_i c_i$. Then, the first item of the ordered items list of the cluster is removed from this list and appended to the final items list. And the credit of $c_{i_{max}(t)}$ is lowered by one, i.e., $c_{i_{max}(t)} := c_{i_{max}(t)} - 1$ In case there are multiple clusters that have a maximum credit value, then an arbitrary one of these clusters can be selected.

Initially, the credits of all clusters are zero. It will be clear that in each iteration the sum of all added credit shares sum up to one unit and that the credit of one of the clusters is again lowered by one unit. Consequently, the sum of all credits will again sum up to zero after each iteration. This approach will result in interleaving the items of the different clusters, while still giving preference to highly related items.

Credit-based scheduling with threshold.

The credit-based approach discussed above does not avoid that items with a very low relatedness end up relatively high in the final items list. To avoid this, a relative threshold a is introduced that makes a result $r_j$ only eligible for appending to the final items list if $$\mathrm{rel}(r_j, p) \geq \alpha \cdot \mathrm{rel}_{max}(t),$$

where $\mathrm{rel}_{max}(t) = \max_i r(i,t)$ denotes the maximum relatedness of an item that has not yet been appended to the final items list. Hence, if the highest relatedness of the items in a given cluster equals 0.2, and if threshold $\alpha$ is set to 0.5, then the first item of this cluster will only become eligible for appending to the final items list when the maximum relatedness of the items that are still to be assigned to the final items list has dropped to 0.4.

The above credit-based scheduling is thus adapted as follows. Now, at the start of each iteration t, first the relatedness $\mathrm{rel}_{max}(t)$ of the overall highest related item, i.e., $$\mathrm{rel}_{max}(t) = \max_i r(i,t),$$

is determined where the maximum can simply be determined by taking the maximum over the first items of each of the clusters (provided that they still have items that are not appended to the final items list). Then, the set E(t) of clusters is determined that are eligible to append an item to the final items list during iteration t. Next, only the credits of the eligible clusters are increased as indicated above, whereby the normalization is now based on only the eligible clusters, and an eligible cluster with the highest credit appends to its first item to the final items list.

EXAMPLE

Now, the above credit-based scheduling approach is illustrated by way of a small example. Assume that the threshold a is set to 0.5. The resulting threshold for each iteration step is mentioned in the line underneath each table and determines eligibility of a cluster; see column 3 of each table. Please note that only credits of eligible clusters are updated in a respective iteration step; see column 4 of each table. After updating the credit, the cluster having the highest credit is selected and the item having the highest relatedness value in this credit is then selected to be added to the sorted list; see column 5 of each table. Thereafter, the credit of this particular cluster is decreased by 1; see column 6 of each table.

The calculation steps for determining the credit values are printed in italics in the following tables.

Iteration 1:

|  | Relatedness of successive items | eligible | Credit at the start of iteration | selected | Credit at the end of iteration |
|---|---|---|---|---|---|
| Cluster 1 | 0.9, 0.6, 0.6 | x | 0.0→1.0<br>*0.0 + 0.9/0.9* | x | 1.0→0.0<br>*1.0 − 1* |
| Cluster 2 | 0.4, 0.4, 0.3 |  | 0.0 |  | 0.0 |
| Cluster 3 | 0.2, 0.1, 0.1 |  | 0.0 |  | 0.0 | threshold for eligibility: 0.9 * 0.5 = 0.45

Relatedness of items in the sorted final items list after iteration 1: 0.9

Iteration 2:

|  | Relatedness of successive items | eligible | Credit at the start of iteration | selected | Credit at the end of iteration |
|---|---|---|---|---|---|
| Cluster 1 | 0.6, 0.6 | x | 0.0→0.6<br>*0.0 + (0.6/<br>(0.6 + 0.4))* | x | 0.6→−0.4<br>*0.6 − 1* |
| Cluster 2 | 0.4, 0.4, 0.3 | x | 0.0→0.4<br>*0.0 + (0.4/<br>(0.6 + 0.4))* |  | 0.4 |
| Cluster 3 | 0.2, 0.1, 0.1 |  | 0.0 |  | 0.0 | threshold for eligibility: 0.6 * 0.5 = 0.3

Relatedness of items in the sorted final items list after iteration 2: 0.9, 0.6

Iteration 3:

|  | Relatedness of successive items | eligible | Credit at the start of iteration | selected | Credit at the end of iteration |
|---|---|---|---|---|---|
| Cluster 1 | 0.6 | x | −0.4→0.2<br>*0.6 + (0.6/<br>(0.6 + 0.4))* |  | 0.2 |
| Cluster 2 | 0.4, 0.4, 0.3 | X | 0.4→0.8<br>*0.4 + (0.6/<br>(0.6 + 0.4))* | X | 0.8→−0.2<br>*0.8 − 1* |
| Cluster 3 | 0.2, 0.1, 0.1 |  | 0.0 |  | 0.0 | threshold for eligibility: 0.6 * 0.5 = 0.3

Relatedness of items in the sorted final items list after iteration 3: 0.9, 0.6, 0.4. Please note, that now the first to items (as represented by their relatedness value) are taken from to cluster 1 while the third item in the list is taken from cluster 2 and thus causes diversity of the items in the top of the list.

Iteration 4:

|  | Relatedness of successive items | eligible | Credit at the start of iteration | selected | Credit at the end of iteration |
|---|---|---|---|---|---|
| Cluster 1 | 0.6 | x | 0.2→0.8<br>*0.2 + (0.6/<br>(0.6 + 0.4))* | x | 0.8→−0.2<br>*0.8 − 1* |
| Cluster 2 | 0.4, 0.3 | X | −0.2→0.2<br>*−0.2 + (0.4/<br>(0.6 + 0.4))* |  | 0.2 |
| Cluster 3 | 0.2, 0.1, 0.1 |  | 0.0 |  | 0.0 | threshold for eligibility: 0.6 * 0.5 = 0.3

Relatedness of items in the sorted final items list after iteration 4: 0.9, 0.6, 0.4, 0.6

Iteration 5:

|  | Relatedness of successive items | eligible | Credit at the start of iteration | selected | Credit at the end of iteration |
|---|---|---|---|---|---|
| Cluster 1 |  |  | −0.2 |  | −0.2 |
| Cluster 2 | 0.4, 0.3 | x | 0.2→0.87<br>*0.2 + (0.4/<br>(0.4 + 0.2))* | x | 0.87→−0.13<br>*0.87 − 1* |
| Cluster 3 | 0.2, 0.1, 0.1 | x | 0.0→0.33<br>*0.0 + (0.2/<br>(0.4 + 0.2))* |  | 0.33 | threshold for eligibility: 0.4 * 0.5 = 0.2

Relatedness of items in the sorted final items list after iteration 5: 0.9, 0.6, 0.4, 0.6, 0.4

Iteration 6:

|  | Relatedness of successive items | eligible | Credit at the start of iteration | selected | Credit at the end of iteration |
|---|---|---|---|---|---|
| Cluster 1 |  |  | −0.2 |  | −0.2 |
| Cluster 2 | 0.3 | x | −0.13→0.47<br>*−0.13 + (0.3/<br>(0.3 + 0.2))* |  | 0.47 |
| Cluster 3 | 0.2, 0.1, 0.1 | x | 0.33→0.73<br>*0.33 + (0.2/<br>(0.3 + 0.2))* | x | 0.73→−0.27<br>*0.73 − 1* | threshold for eligibility: 0.3 * 0.5 = 0.15

Relatedness of items in the sorted final items list after iteration 6: 0.9, 0.6, 0.4, 0.6, 0.4, 0.2

Iteration 7:

|  | Relatedness of successive items | eligible | Credit at the start of iteration | selected | Credit at the end of iteration |
|---|---|---|---|---|---|
| Cluster 1 |  |  | −0.2 |  | −0.2 |
| Cluster 2 | 0.3 | x | 0.47→1.22<br>*0.47 + (0.3/<br>(0.3 + 0.1))* | x | 1.22→0.22<br>*1.22 − 1* |

-continued

| | Relatedness of successive items | eligible | Credit at the start of iteration | selected | Credit at the end of iteration |
|---|---|---|---|---|---|
| Cluster 3 | 0.1, 0.1 | x | −0.27→−0.02 −0.27 + (0.1/ (0.3 + 0.1)) | | −0.02 | threshold for eligibility: 0.3 * 0.5 = 0.15

Relatedness of items in the sorted final items list after iteration 7: 0.9, 0.6, 0.4, 0.6, 0.4, 0.2, 0.3

Hence, the sorted final list of items gives the following ordering by relatedness: 0.9, 0.6, 0.4, 0.6, 0.4, 0.2, 0.3, 0.1, and 0.1.

Note that by changing the threshold a, the emphasis that is put on relatedness or diversity can be adapted. If one chooses a equal to 1, then the final items list will be ordered entirely by relatedness. Alternatively, if one chooses a equal to 0, then all clusters are eligible whatever the relatedness of their first item and one gets a more diverse final list of items. However, also in that case, highly related items are still preferred, since they will get higher shares.

The threshold can be set by the user, so that he can indicate to what extend he wants more diverse items in the top of the results list, possibly at the cost of encountering less related items in the top.

Alternative credit-based scheduling approaches, such as round-robin, are also possible.

An additional embodiment concerns the situation where multiple providers (i.e., internet video repositories) are used to send queries to. In that case, one also wants to interleave the items representing results of the different providers such that the final items list has a nice mix of results from the different providers, assuming that the results of the different providers are all equally related. This could be realized by a hierarchical credit-based scheduling approach. One could first simply merge the results (items) from the different providers, before clustering the items. Then after clustering, one could for each cluster first order the items within the cluster by a credit-based approach, as discussed above. In that case, the cluster is first subdivided into sub-clusters, where each sub-cluster corresponds to a specific provider. After that, the final items list can be obtained by merging the ordered items lists of the different clusters, again by using a credit-based approach as discussed above.

Preferably, setting the threshold will be part of the user interface.

The device and the method described herein can be particularly applied in any context where recommenders can be used, e.g., of books, songs, rental videos, et cetera, where results have to be presented to end users where diversity and relatedness have to be balanced. More specifically, it can be used in the context of personal channels. It offers a possible approach to realize a lean-back type of integration between TV watching and browsing internet videos.

What is claimed is:

1. An electronic device for automatic generation of a sorted list of items from further items related to a seed item, the electronic device comprising a query generator for generating multiple queries to be sent to item repositories and that are based on the seed item and for receiving results from the queries representing a plurality of further items;
the electronic device further comprising a relatedness determinator configured to compare the seed item with the plurality of further items and to thus determine a relatedness value for each further item with respect to the seed item,
the electronic device further comprising a clustering engine configured to cluster the further items by assigning the plurality of further items of each query to one respective cluster, and
the electronic device further comprising a list generator configured to generate a sorted result list, wherein the list generator comprises a cluster creditor and an item selector,
wherein the cluster creditor is configured to initially assign initial credits to the clusters and
wherein the cluster creditor is configured in further iterative steps:
to update the credits by adding added credit to the clusters while not amending the relatedness value of the items in the clusters, and
wherein the item selector is configured in each of the further iterative steps:
to select an item that is to be added to the sorted list that has the highest relatedness value in a cluster having the highest credit, to add the selected item to the sorted list, and to remove the selected item from the cluster it belonged to and
wherein the cluster creditor is configured in each of the further iterative steps:
to decrease the credit of the cluster from which the selected item that was added to the sorted list was removed.

2. The electronic device of claim 1, wherein the cluster creditor is configured to update credits only for those clusters that comprise at least one item with a relatedness value that exceeds a predetermined fraction of the highest relatedness values of all items that have not yet been added to the sorted list and removed from the clusters.

3. The electronic device of claim 2, wherein a threshold adjustment user interface is provided that allows for entering a threshold value that determines the predetermined fraction.

4. A method for sorting further items by creating a sorted list, the method including the steps of
providing a seed item,
generating multiple queries and sending the queries to item repositories, wherein the multiple queries are based on the seed item, and receiving results from the queries representing a plurality of further items,
comparing the plurality of further items to the seed item and determining a relatedness value for each further item with respect to the seed item, said relatedness value reflecting a degree of similarity of said further item from said plurality of items with the seed item,
clustering the further items into a number of clusters by grouping the further items of each query in clusters so that each item belongs to one cluster that contains items with relatively high degree of similarity among them compared to items in other clusters, and
generating a sorted list from the further items by scheduling the further items depending on the relatedness value and the membership of the further items to a certain cluster, wherein items are added to the sorted list one-by-one, wherein the step of generating a sorted list is performed in an iterative manner, and wherein initially
a) initial credits are assigned to the clusters and in each iterative step, b) credits are updated by adding added credit to the clusters while not amending the relatedness value of the items in the clusters,
c) an item that is to be added to the sorted list is selected that has the highest relatedness value in a cluster having the highest credit,
d) the selected item is added to the sorted list and removed from the cluster, and
e) the credit of the cluster from which the added item was removed is decreased, and wherein steps b) to e) are repeated until all or a predetermined number of the further items are added to the sorted list.

5. The method of claim 4, wherein step b) "credits are updated" is performed only with those clusters including items that have a relatedness value that is higher than a predetermined fraction of the highest relatedness value of all further items in any cluster.

* * * * *